US008656598B2

(12) United States Patent
Kaiser et al.

(10) Patent No.: US 8,656,598 B2
(45) Date of Patent: Feb. 25, 2014

(54) HAND-HELD POWER JIGSAW

(75) Inventors: Hans Kaiser, Leuzigen (CH); Marcel Casota, Gelterkinden (CH); Joachim Platzer, Remseck-Hochberg (DE); Thilo Koeder, Gerlingen (DE); Ulli Hoffmann, Niefern-Oeschelbronn (DE); Jan Koegel, Mount Prospect, IL (US)

(73) Assignee: Robert Bosch GmbH, Stuttgart (DE)

( * ) Notice: Subject to any disclaimer, the term of this patent is extended or adjusted under 35 U.S.C. 154(b) by 361 days.

(21) Appl. No.: 13/000,936

(22) PCT Filed: Apr. 27, 2009

(86) PCT No.: PCT/EP2009/055025
§ 371 (c)(1),
(2), (4) Date: Feb. 24, 2011

(87) PCT Pub. No.: WO2009/156210
PCT Pub. Date: Dec. 30, 2009

(65) Prior Publication Data
US 2011/0131820 A1  Jun. 9, 2011

(30) Foreign Application Priority Data

Jun. 26, 2008 (DE) .......................... 10 2008 002 678

(51) Int. Cl.
*B27B 19/09* (2006.01)
*B27B 11/02* (2006.01)

(52) U.S. Cl.
USPC ................................................. 30/393; 30/376

(58) Field of Classification Search
USPC ......... 30/392–394, 374–376; 83/747, 699.21; 74/50
See application file for complete search history.

(56) References Cited

U.S. PATENT DOCUMENTS

| 3,448,781 | A | * | 6/1969 | Angelucci ....................... 30/392 |
| 4,055,893 | A | * | 11/1977 | Saxe ............................... 30/392 |
| 2004/0128843 | A1 | | 7/2004 | Walker | |
| 2005/0257385 | A1 | * | 11/2005 | Walker ............................ 30/392 |
| 2011/0119933 | A1 | * | 5/2011 | Kaiser et al. .................... 30/376 |
| 2011/0126687 | A1 | * | 6/2011 | Kaiser et al. .................... 83/746 |

FOREIGN PATENT DOCUMENTS

GB    2399314 A    9/2004

* cited by examiner

*Primary Examiner* — Laura M Lee
(74) *Attorney, Agent, or Firm* — Maginot, Moore & Beck

(57) ABSTRACT

A handheld jigsaw, such as a compass saw (10), is disclosed that comprises a housing (12, 13) and a lifting rod (20) having a pendulum mechanism (38). The pendulum mechanism includes a pendulum lever (40) with which a pendulum stroke can be given during sawing to a saw blade (28) carried by the lifting rod (20). The lifting rod (20) is arranged such that it can rotate about its own axis (21) thereof and pivot transversely to the axis (21), and wherein the pendulum mechanism (38) can rotate about the axis (21).

12 Claims, 6 Drawing Sheets

HAND-HELD POWER JIGSAW

CROSS-REFERENCE TO RELATED APPLICATION

This application is a 35 USC 371 application of PCT/EP 2009/055025 filed on Apr. 27, 2009.

BACKGROUND OF THE INVENTION

1. Field of the Invention

The present invention is based on a hand-held power jigsaw.

2. Description of the Prior Art

Scrolling power jigsaws that are equipped with a saw blade that can pivot around its longitudinal axis are known, with which it is more convenient to saw curves than with conventional jigsaws because it is possible to orient the saw blade together with the lifting rod relative to the power jigsaw, tangentially to the curve to be sawn, without needing to turn the whole jigsaw.

Virtually all known high-quality jigsaws operate with an adjustable pendulum action in which during sawing, the saw blade—in addition to the axial up and down motion—is driven to oscillate transversely to the longitudinal axis in the plane of the advancing direction. This improves cutting performance. The pendulum action is transmitted directly to the saw blade spine usually by means of a pendulum lever equipped with a saw blade guide roller. The saw blade guide roller encompasses the saw blade spine in a form-locked, rolling fashion. It assures that the saw blade is always oriented straight ahead and prevents this saw blade position from changing. Therefore in known scrolling jigsaws, the pendulum action is deactivated in the scrolling mode and cannot be activated because in this mode, the saw blade leaves its straight-ahead position and is only able to do so when disengaged from the pendulum lever and/or pendulum roller. Due to the lack of pendulum action, the known jigsaws have a reduced cutting performance in scrolling mode.

ADVANTAGES AND SUMMARY OF THE INVENTION

The invention has the advantage that jigsaws, even in the scrolling mode, operate with pendulum action and therefore sawing progress is increased. This is achieved by the fact that during active pendulum action, the lifting rod can be rotated manually or in a motor-driven fashion. In addition, ergonomics and work safety are improved since lower operating forces and lower advancing force are required in the scrolling mode.

The pendulum action and scrolling mode can be combined with each other because the lifting rod is able to pivot around its own axis and also transversely to the axis, with the pendulum mechanism being able to rotate together with the lifting rod around its longitudinal axis.

The scrolling mode is secured in a simple way in that the pendulum mechanism has a pendulum lever and a support that holds the pendulum lever so that it is able to move, in particular around a pendulum axle, which support is coupled to the lifting rod in a rotary-driving fashion and the fact that the lifting rod is supported in a way that permits it to slide in relation to the support.

The scrolling mode is secured over a wide angular range in that pendulum lever is provided with means that ensure the transmission of a pendulum action to the saw blade in each of the possible rotary positions of the pendulum lever.

The scrolling mode is secured through a support surface that is provided on the pendulum lever and is oriented toward a pendulum action-transmitting element in a way that permits the stroke to be exerted on it across the rotation range of the pendulum lever.

The invention is simplified in that the support surface is embodied as annular, in particular in the form of a circular ring-shaped disc that is rigidly connected to the pendulum lever/roller lever.

This is characterized in that the support is supported in an axially fixed, rotatable fashion, particularly in the housing.

The scrolling mode is adjustable in that it is possible to adjust the support in rotary fashion from the outside by means of a transmission.

A simple adjusting mechanism for the scrolling mode is produced in that the support encompasses the lifting rod in annular fashion and is equipped with a gearing that can be coupled to an adjusting pinion that can be rotary driven by motor, by hand, or by means of an actuating mechanism.

The adjusting force for varying the scrolling mode can be introduced in a reliable way in that the actuating mechanism of the adjusting pinion has a rotary drivable actuating shaft.

The scrolling mode can be varied with simple means in that it is possible to adjust the actuating shaft in rotary fashion by hand, with control of the rotation angle.

The scrolling adjustment is easy to control because it is possible for the actuating shaft to be coupled to a manual rotation lever, rotary knob, or the like, which is provided with an indicator that can be adjusted relative to an angular scale.

The angular position of the saw blade can be adjusted and corrected in an automatic, particularly precise, and rapid fashion in that it is possible to adjust the actuating shaft in a rotary, sensor-controlled fashion by means of an actuating motor.

BRIEF DESCRIPTION OF THE DRAWINGS

The invention will be explained in greater detail below in conjunction with an exemplary embodiment with accompanying drawings.

DESCRIPTION OF THE PREFERRED EMBODIMENT

Figure 1:
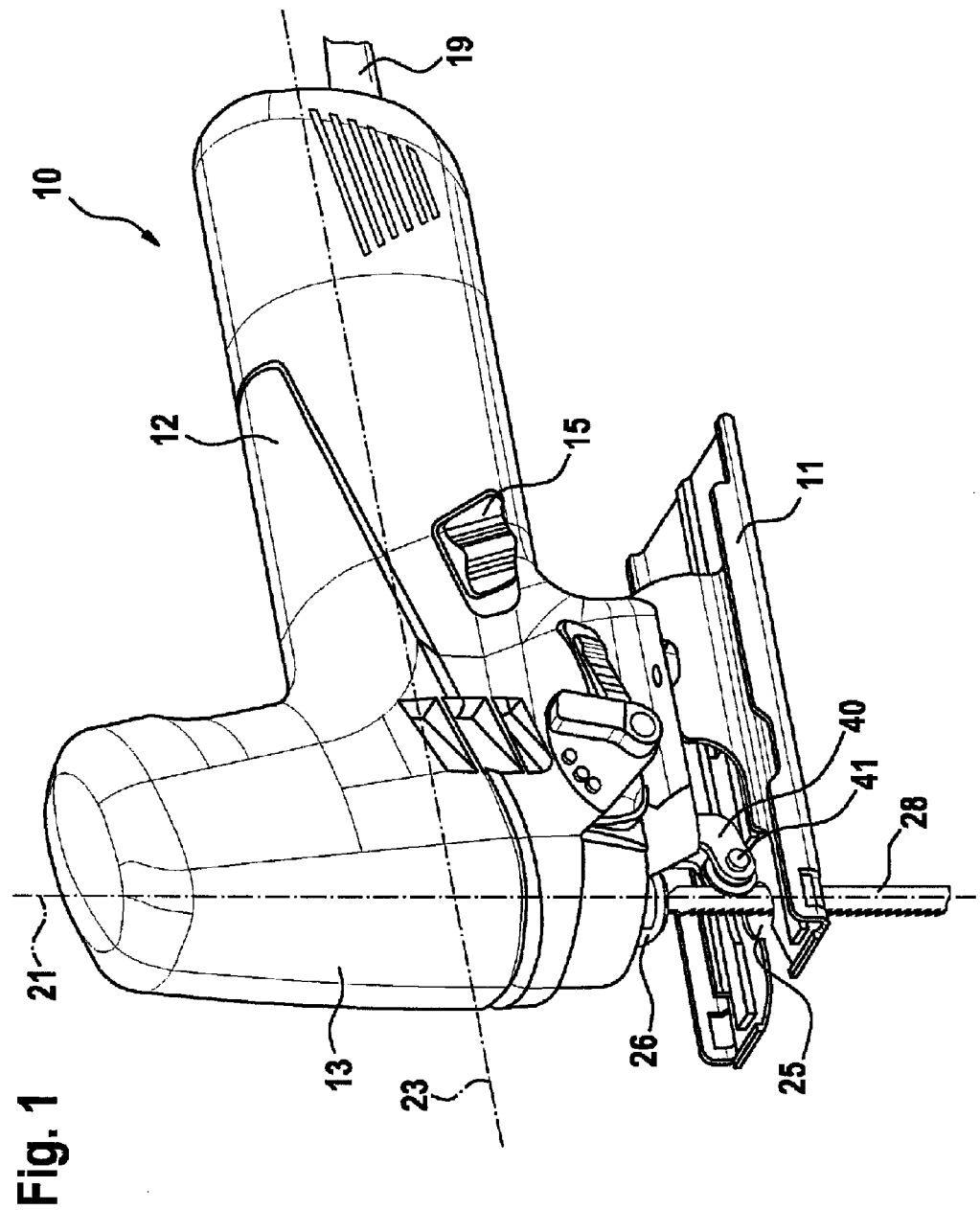
FIG. 1 shows a side view of the hand-held power tool according to the invention.

The side view in FIG. 1 shows a hand-held power tool according to the invention, embodied in the form of a jigsaw 10, its motor housing 12 and transmission housing 13, and its saw blade 28, which protrudes downward through the opening 25 at the front of a base plate 11 and is secured in a clamping device 26 on a lifting rod 20. In addition, the jigsaw 10 has a switch actuation lever 15 for switching its motor on and off and a power cord 19 for supplying power to the motor. The longitudinal axis 23 of the jigsaw 10, which defines the normal advancing direction when sawing, extends parallel to the motor housing 12.

Figure 2:
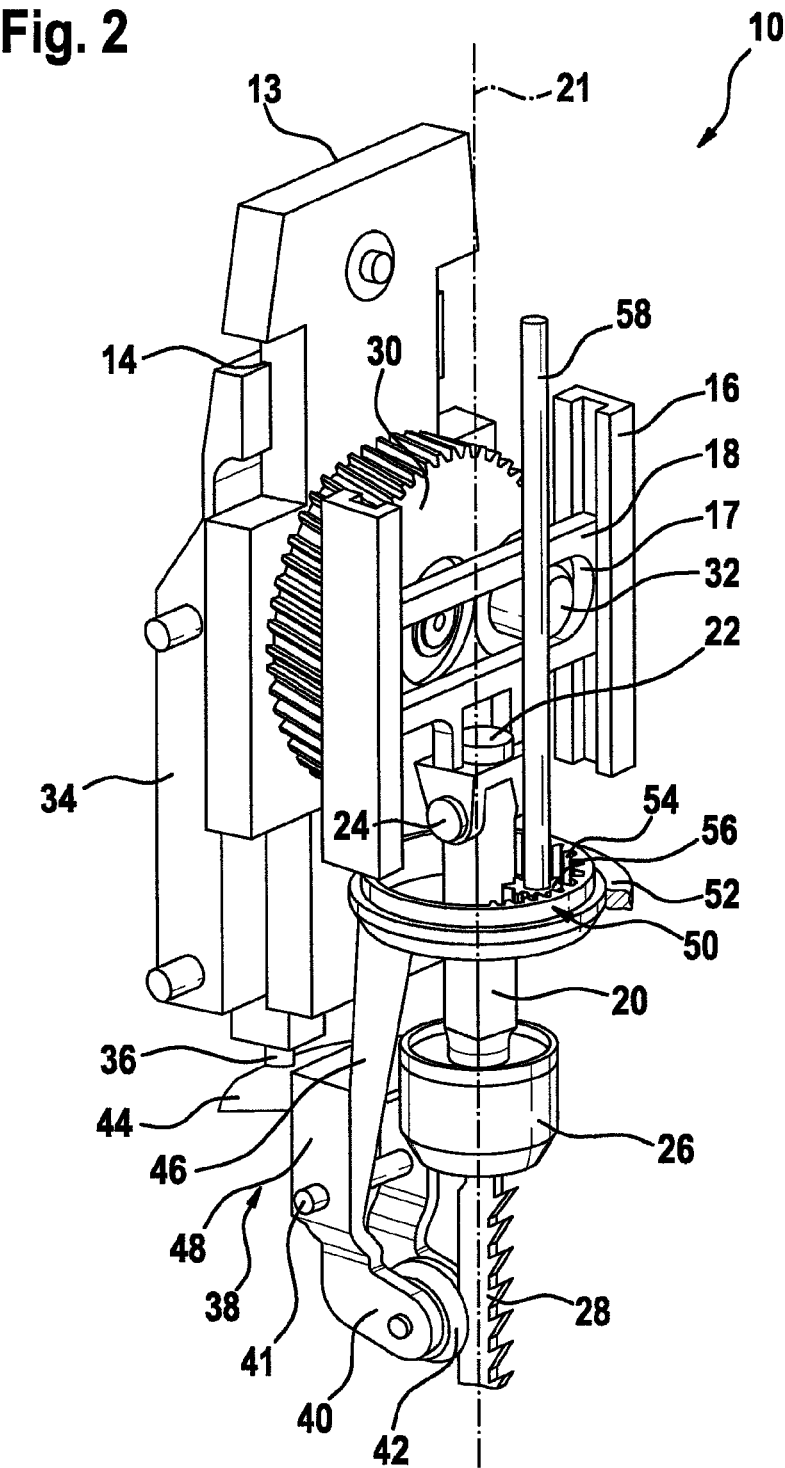
FIG. 2 is a three-dimensional depiction of the lifting rod with the lifting drive and pendulum drive.

In a transmission housing 13 schematically depicted in FIG. 2, the three-dimensionally depicted lifting rod 20 is supported with a lifting drive and pendulum drive. The drawing here shows a longitudinal guide 14 for a compensating weight 34 that is able to move in opposition to the lifting rod 20 and compensate for its oscillations and is supported so that it is able to move up and down on the rear side of a plate-like part of the transmission housing 13. On its underside, the compensating weight 34 supports a pendulum action-transmitting element 36 in the form of a cam that transmits the up-and-down motion of the compensating weight 34 to a pendulum mechanism 38, and in particular to a support surface 44 of a pendulum lever 40, thus forcing the latter to execute a pendulum motion around its pendulum axle 41. The support surface 44 is embodied in the form of an annular segment. The pendulum action-transmitting element 36 can therefore act on the support surface 44, thus producing the pendulum action even in rotated positions of the pendulum lever 40 around the lifting rod axis 21. The pendulum lever 40 can only be pivoted together with the support 46 around the lifting rod axis 21, away from the straight-ahead position of the saw blade 28.

The pendulum axle 41 of the pendulum lever 40 is situated on a support 46, whose lower region 48 extends behind the saw blade and flush with it and whose upper region 50 encompasses the lifting rod 20 in annular fashion. With its rotatable guide roller 42 at the lower end, the pendulum lever 40 rests against the spine of the saw blade 28. In so doing, it embraces the spine of the saw blade 28 laterally, permitting its rolling motion. The upper region 50 of the support 46 is supported in the transmission housing 13 so that it is axially immobile, but able to rotate around the lifting rod axis 21.

With a central square hole 51 (FIGS. 6 and 7), the support 46 encompasses the cross-sectionally rectangular or square lifting rod 20 so that the latter is easily able to execute its vertical stroke motion and its forward and back pendulum action. If the support 46 is rotated around the lifting rod axis 21 in an axial bearing 52 (FIG. 4), the pendulum lever 40 and lifting rod 20 follow along. For this purpose, the square hole 51 is dimensioned so that it has only a small amount of play transversely to the lifting rod 20, but has considerably more play in the direction of the pendulum action than in the transverse direction, as required by the lifting rod 20 for the pendulum action.

The lifting rod 20 has a sliding block 18 at the top (FIG. 2). By means of this sliding block, the lifting rod 20 is driven in longitudinally reciprocating fashion. The sliding block 18 is guided so that it can slide up and down in a longitudinal guide 16 affixed to the housing, in front of the front side of the plate-like part of the transmission housing 13. An eccentric pin 32 of an eccentric gear 30 situated between the plate-like part and the lifting rod extends through the sliding block in a transversely extending sliding block slot 17. The eccentric pin 32 drives the sliding block 18 and together with it, the lifting rod 20. By means of an axle oriented toward the rear, the eccentric gear 30 is supported in rotary fashion on the plate-like part of the transmission housing 13.

To enable the lifting rod 20 to rotate around the lifting rod axis 21, it is supported in rotary fashion on a sliding block 18 with a swivel 22 that defines the lifting rod axis 21. Below the swivel 22, the lifting rod 20 has a pendulum linkage 24 that permits the pendulum motion of the lifting rod 20 and saw blade 28 together with the clamping device 26.

In its upper region 50 embodied in the form of a live ring, the support 46 is provided with an internal gearing 54 that is engaged by a planetary wheel-like adjusting pinion 56, which is able to rotate by means of an actuating shaft 58 oriented vertically upward. Through a rotary actuation of the actuating shaft 58, it is possible to rotationally adjust the support 46 and together with it, the pendulum lever 40, guide roller 42, and lifting rod 20. It is thus possible within certain limits to saw and scroll when the jigsaw 10 is in scrolling mode, i.e. provided that it is possible for the pendulum action-transmitting element 36 to contact the support surface 44 in a supporting fashion. If the support surface is embodied in the form of a 180° ring segment, then it is possible to scroll across this angular range.

Figure 3:
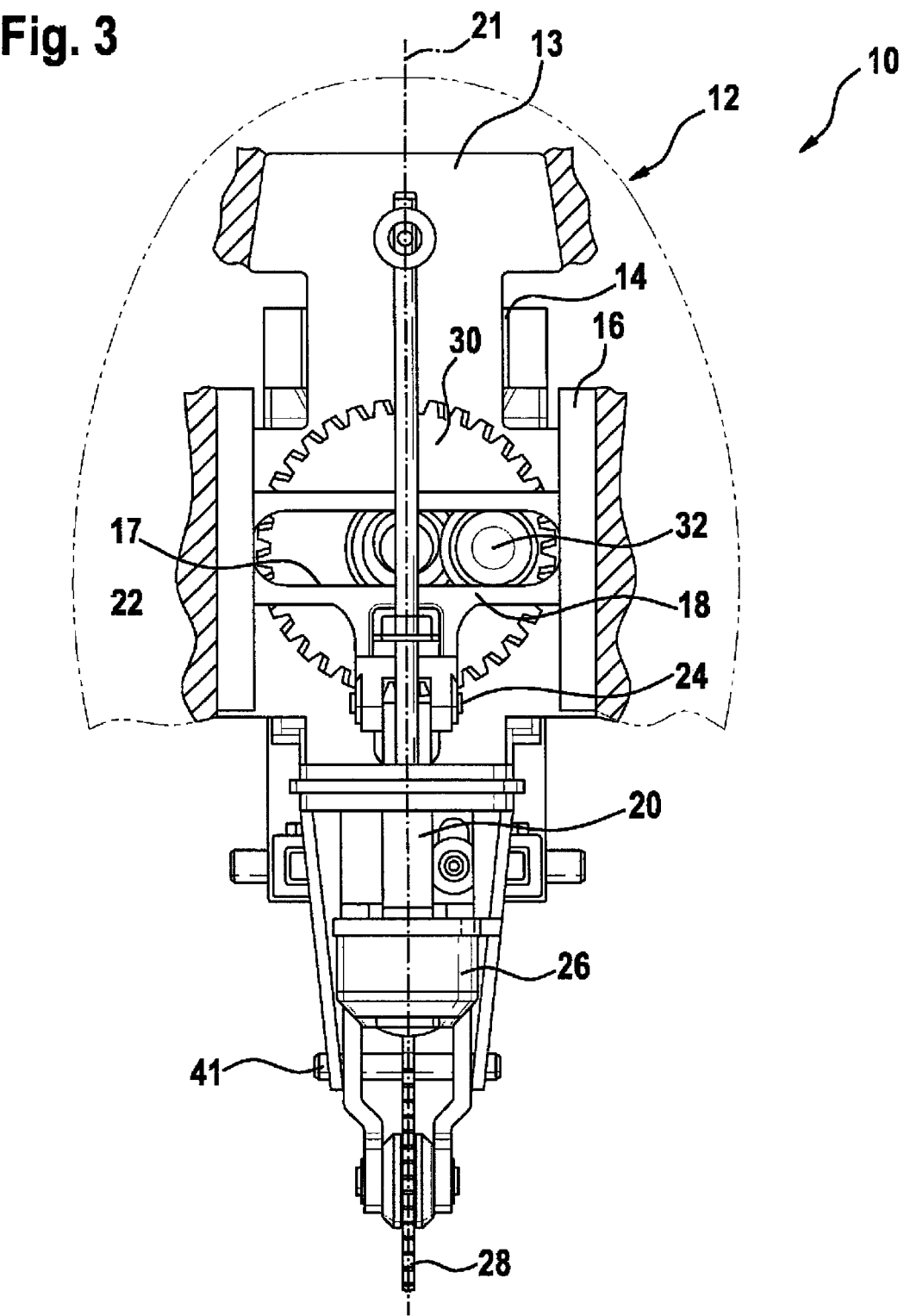
FIG. 3 is a front view of FIG. 2.

FIG. 3 is a schematic depiction of the transmission housing 13 from FIG. 2, in a front view that shows the details in FIG. 2 from a different viewing angle, in particular the plate-like part of the transmission housing 13 and the embodiment of the eccentric gear 30; details that have already been explained in conjunction with FIG. 2 need not be described again here.

Figure 4:
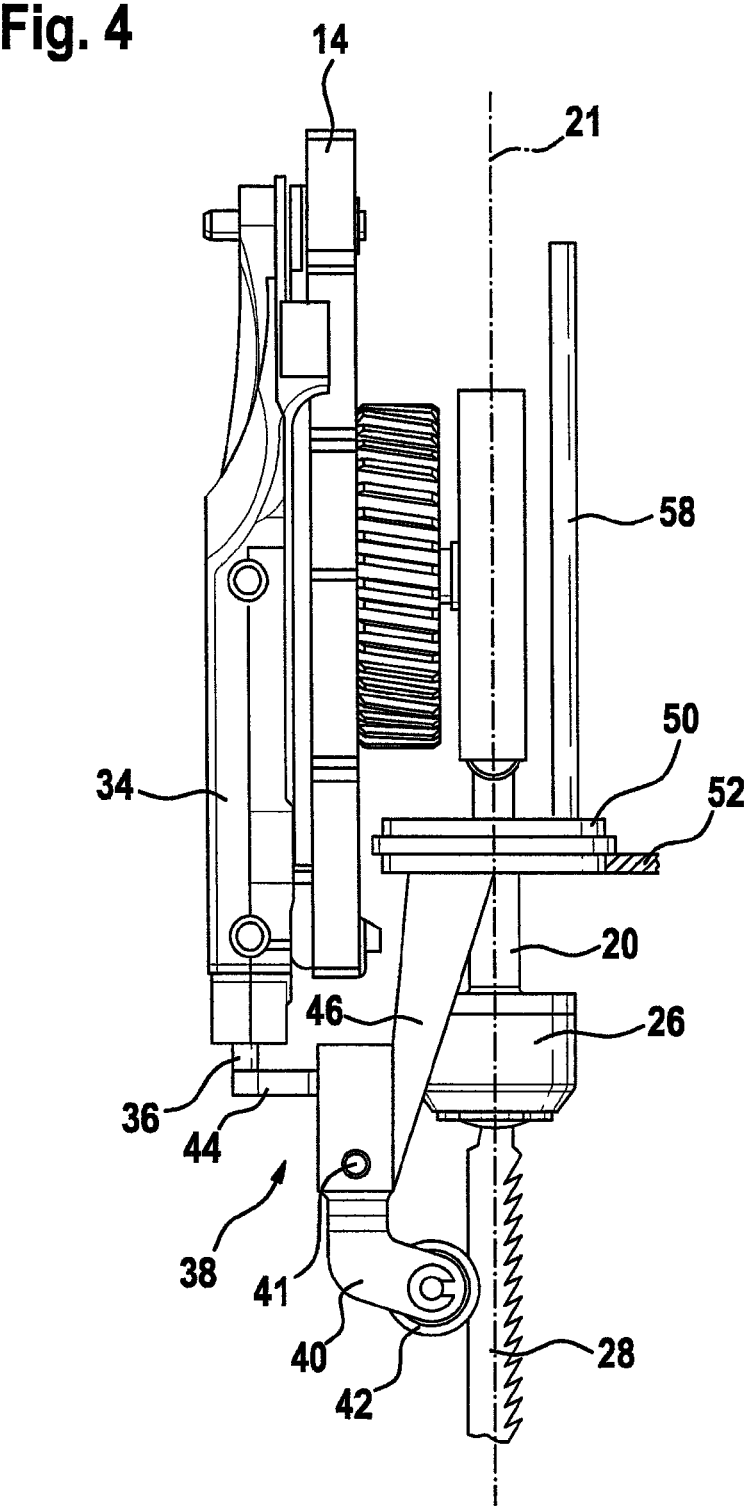
FIG. 4 is a side view of FIG. 2.

FIG. 4 is a schematically depicted side view of the transmission housing 13 from FIG. 2; in addition to the depiction in FIG. 3, in this case the axial bearing 52 for the upper region 50 of the support 46 embodied as a live ring, is depicted. Here, too, it is not necessary to describe details that have already been explained in conjunction with FIG. 2.

Figure 5:
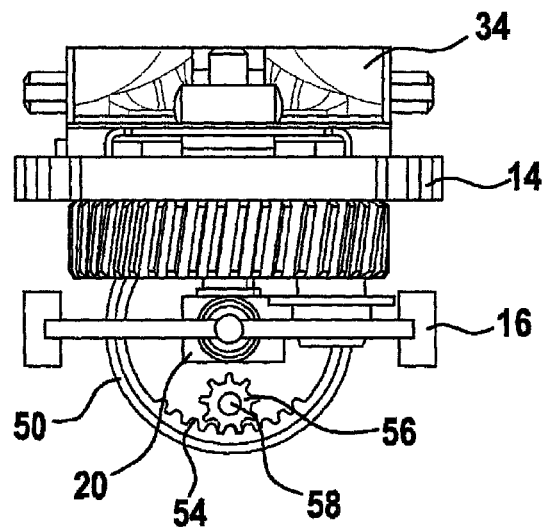
FIG. 5 is a top view of FIG. 2.

FIG. 5 is a schematically depicted top view of the transmission housing 13 from FIG. 2; in addition to the depiction in FIG. 3, in this case the live ring 50 of the support 46, with its gearing 54 and the adjusting pinion 56, is particularly visible. Here, too, it is not necessary to describe details that have already been explained in conjunction with FIG. 2.

Figure 6:
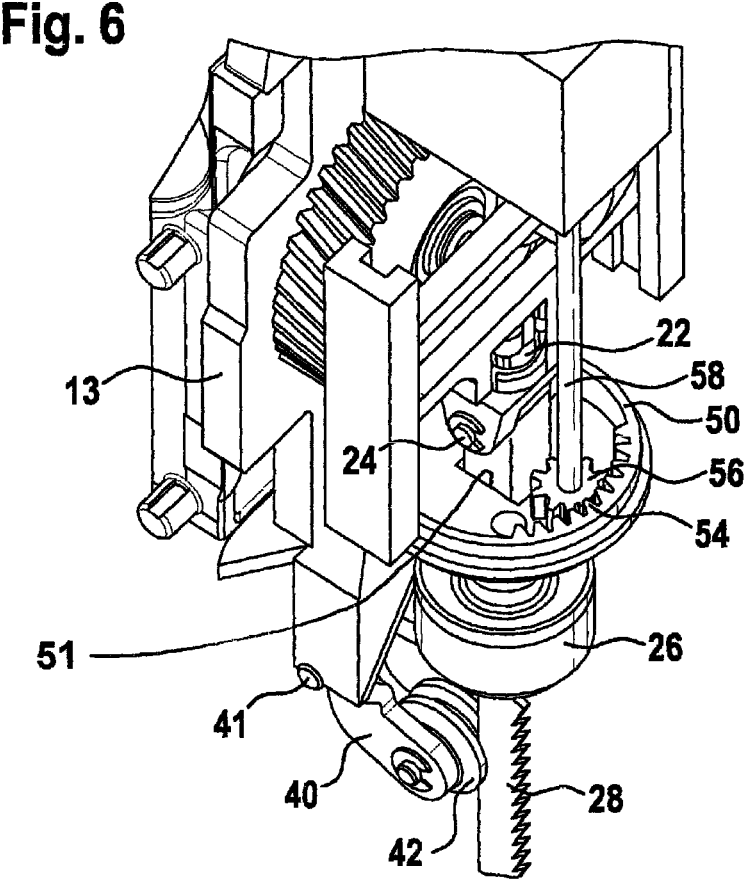
FIG. 6 is an enlarged three-dimensional view of FIG. 2.

FIG. 6 shows another enlarged three-dimensional depiction that is essentially the same as the one in FIG. 2; it is not necessary to repeat the description of details already explained in conjunction therewith.

Figure 7:
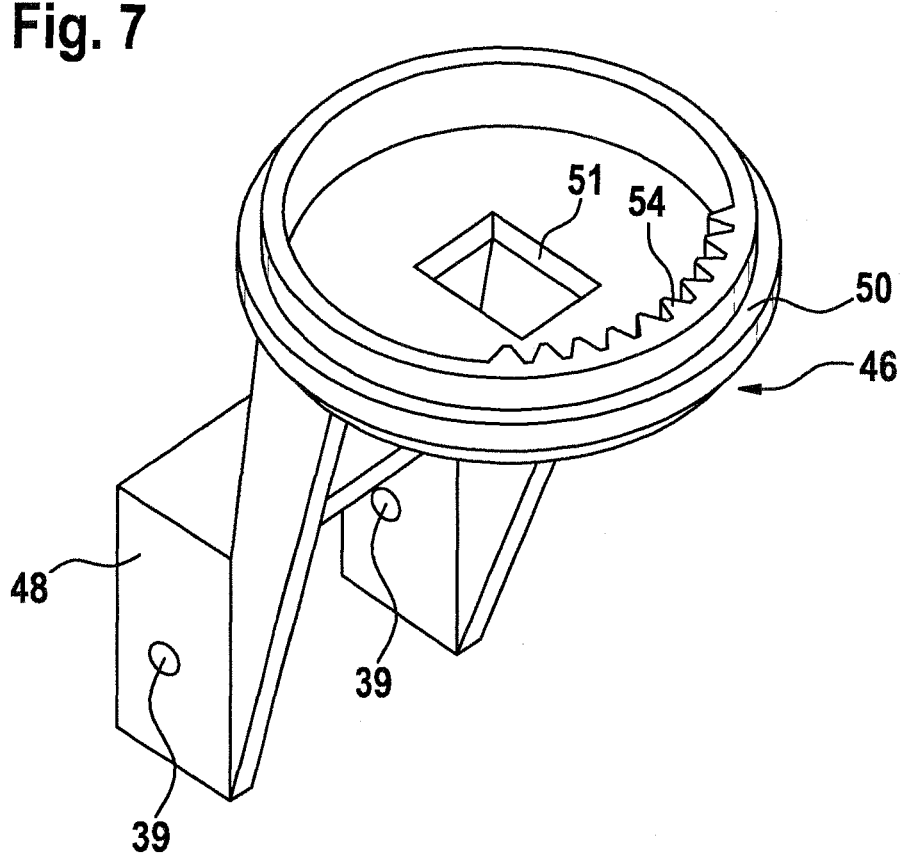
FIG. 7 shows a three-dimensional detail of the support.

FIG. 7 is a three-dimensional view of the support 46 as a separate part, clearly depicting the lower region 48 and upper region 50, the gearing 54, the oblong-dimensioned square hole 51, and the bores 39.

Through rotation of the actuating shaft around its axis, the support rotates around its axis together with its live ring and consequently also the roller lever and lifting rod. This changes the angular position of the saw blade and assures the pendulum function (synchronous to the saw blade).

In this case, the lifting rod rotation can be controlled in an autonomous or remote-controlled fashion by means of an optoelectronic unit.

The foregoing relates to the preferred exemplary embodiment of the invention, it being understood that other variants and embodiments thereof are possible within the spirit and scope of the invention, the latter being defined by the appended claims.

The invention claimed is:
1. A hand-held power jigsaw, comprising:
   a housing;
   a lifting rod coupled to a reciprocating mechanism mounted in the housing and supported to both rotate about its own axis and pivot transversely to the axis relative to the reciprocating mechanism, said lifting rod configured to engage a jigsaw blade; and
   a pendulum mechanism including;
      a support mounted in the housing to rotate about the axis of the lifting rod and configured as a rotary-driving mechanism for adjusting the angular position of the pendulum mechanism, the support configured to impart rotation to the lifting rod upon adjustment of the angular position; and
      a pendulum lever pivotably connected by a pendulum axle to the support to pivot transversely to the axis of the lifting rod and configured to impart a pendulum action to the jigsaw blade that is supported by the lifting rod.

2. The hand-held power jigsaw as recited in claim 1, wherein the lifting rod is configured to slide axially in relation to the support.

3. The hand-held power jigsaw as recited in claim 1, wherein the pendulum lever is provided with transmissions means that ensure transmission of a pendulum action to the saw blade in each possible rotary position of the pendulum lever.

4. The hand-held power jigsaw as recited in claim 3, wherein the transmission means are embodied as a support surface that is provided on the pendulum lever and is oriented toward a pendulum action-transmitting element in a way that permits a stroke to be exerted on the support surface for an entire rotation range of the pendulum lever.

5. The hand-held power jigsaw as recited in claim 4, wherein the support surface is embodied as annular segment, which is rigidly connected to the pendulum lever.

6. The hand-held power jigsaw as recited in claim 1, wherein the support is supported in an axially fixed, rotatable fashion, in the housing.

7. The hand-held power jigsaw as recited in claim 2, wherein the support is supported in an axially fixed, rotatable fashion, in the housing.

8. The hand-held power jigsaw as recited in claim 6, wherein the support is configured for adjustment in rotary fashion from outside the housing by a transmission.

9. The hand-held power jigsaw as recited in claim 1, wherein the support encompasses the lifting rod in annular fashion and is equipped with a gearing that is configured to be coupled with an adjusting pinion that has a capacity to be rotary driven by an actuating mechanism, by motor, or by hand.

10. The hand-held power jigsaw as recited in claim 9, wherein the actuating mechanism of the adjusting pinion has a rotary drivable actuating shaft.

11. The hand-held power jigsaw as recited in claim 10, wherein the actuating shaft is configured for adjustment in rotary fashion by hand, with control of the rotation angle.

12. The hand-held power jigsaw as recited in claim 11, wherein the actuating shaft is configured to be coupled to a manual rotation lever or rotary knob which is provided with an indicator that is adjustable relative to an angular scale.

* * * * *